US006985887B1

(12) United States Patent
Sunstein et al.

(10) Patent No.: US 6,985,887 B1
(45) Date of Patent: Jan. 10, 2006

(54) APPARATUS AND METHOD FOR AUTHENTICATED MULTI-USER PERSONAL INFORMATION DATABASE

(75) Inventors: Bruce D. Sunstein, Brookline, MA (US); Eileen C. Shapiro, Cambridge, MA (US)

(73) Assignee: Suncrest LLC, Cambridge, MA (US)

( * ) Notice: Subject to any disclaimer, the term of this patent is extended or adjusted under 35 U.S.C. 154(b) by 0 days.

(21) Appl. No.: 09/448,722

(22) Filed: Nov. 24, 1999

Related U.S. Application Data

(60) Provisional application No. 60/125,234, filed on Mar. 19, 1999.

(51) Int. Cl.
*G06F 17/60* (2006.01)
(52) U.S. Cl. ............................ 705/51; 705/50; 705/56; 705/67; 705/75; 370/218; 707/104; 707/3; 707/2; 707/7; 283/71; 715/854; 715/864
(58) Field of Classification Search ................ 705/50, 705/51, 56, 67, 75; 370/218; 707/2, 3, 7, 707/104; 283/71; 715/854, 864
See application file for complete search history.

(56) References Cited

U.S. PATENT DOCUMENTS

| 6,092,192 | A | * | 7/2000 | Kanevsky et al. | ........... 713/186 |
| 6,154,879 | A | * | 11/2000 | Pare et al. | ................... 705/26 |
| 6,185,683 | B1 | * | 2/2001 | Ginter et al. | ................ 713/176 |
| 6,256,737 | B1 | * | 7/2001 | Bianco et al. | .............. 713/186 |
| 6,532,459 | B1 | * | 3/2003 | Berson | ........................ 707/3 |

FOREIGN PATENT DOCUMENTS

ES       EP 703094 A1 *  3/1996

OTHER PUBLICATIONS

Corwin, Philip S. Notaries in Cyberspace: A New Role for Banks (American Banker, p4 Feb. 10, 1998 ISSN: 0002-7561).*

* cited by examiner

*Primary Examiner*—James P. Trammell
*Assistant Examiner*—James A Reagan
(74) *Attorney, Agent, or Firm*—Bromberg & Sunstein LLP

(57) ABSTRACT

A method of assuring integrity of a personal information in a data base containing personal information provided by multiple users uses in various embodiments physiological identifiers associated with each of the users. Related systems are also provided.

50 Claims, 6 Drawing Sheets

APPARATUS AND METHOD FOR AUTHENTICATED MULTI-USER PERSONAL INFORMATION DATABASE

The present application claims priority from provisional application Ser. No. 60/125,234, filed Mar. 19, 1999, for an invention of the same inventors and title as herein; such application is hereby incorporated herein by reference.

TECHNICAL FIELD

The present invention relates to personal information and medical databases, and particularly to databases used in connection with financial transactions and medical emergencies.

BACKGROUND ART

With the rise of digital communications for a wide range of applications, it is now a commonplace for important financial transactions, and even everyday transactions, to occur over networks of all kinds, including local area networks (LANs and intranets), wide area networks (WANs and extranets), and the Internet. Formerly these transactions were in many cases conducted in person or over the telephone under circumstances where it was often relatively easy for each person to be assured that the other party is actually the person who the party purports to be—namely, to be assured that the party is authentic. Moreover, such transactions commonly occurred under conditions where the universe of potential partes was relatively limited. Authenticity could under those circumstances often be determined by visual inspection (when the transaction is in person) or by personal recognition of a voice (when the transaction is over the telephone).

When the transactions are conducted over a network, identifying information associated with in-person or telephone-based transactions is far more difficult to obtain. Moreover, the universe of potential parties to such transactions is significantly expanded. These circumstances provide an opportunity for individuals to misappropriate in whole or in part the identity of another person for personal gain or other improper purposes. A partial misappropriation of identity occurs in the case of credit card fraud. In addition there are increasing instances of wholesale identity theft, where the perpetrator assumes the identity of another for a continuing series of fraudulent transactions. Indeed, even in-person and telephone-based transactions provide opportunities for identity theft.

In addition, the ubiquitous nature of the Internet has had an effect on information, essentially personal in nature, which has formerly inhabited the domain of private individuals and their immediate communities, and made that information available to the public; the Internet allows much private information to be transformed into public information. Associated with this loss of privacy is in general a greater risk of identity theft.

Central credit card registries exist to provide credit card owners with a single point of reference for registering credit card numbers and, optionally, providing selected other services for dealing with lost or stolen credit cards (e.g., notifying credit card issuers of the theft). However, a credit card registry may itself be used by an unscrupulous individual to perpetrate an identity theft, whereby, for example, a fraudulent change of address may be given to multiple credit card issuers via a credit card registry.

Smart cards typically include data pertaining to the card holder, but in many instances, smart cards will not protect against identity theft; indeed, even with enhanced security, it may be assumed that smart thieves will or could find ways to steal smart cards and that the information stored on these cards may also be stolen.

In another context, authentication-related issues may be important when a person may have critical information to impart but is unexpectedly impaired (for example by reason of an accident or a stroke while traveling alone, etc.). The impaired person, for example, may have certain strictures governing medical treatment (for example, allergy to penicillin) or important preferences as to the scope of medical treatment to be rendered under life-threatening conditions and as to persons to be involved in deciding about such treatment.

SUMMARY OF THE INVENTION

In a first embodiment, the invention provides a method of assuring integrity of a personal information data base containing personal information provided by multiple users. The method includes:
  a. obtaining a user's personal information from the user;
  b. obtaining a first set of physiological identifiers associated with the user;
  c. storing, in a digital storage medium, a data set pertinent to the user, the data set including the user's personal information and a representation of the physiological identifiers associated with the user;
  d. permitting a subject to modify information in the stored data set pertinent to the user only if (i) the subject provides a new set of physiological identifiers and (ii) it is determined, by recourse to the stored data set, that there is a sufficient match between at least one member in the new set and a corresponding member of the first set, so that the subject is authenticated as the user.

What this embodiment may achieve in some aspects is a circumstance wherein individual identity may be established by a user in a proprietary database and wherein that identity is safeguarded. In this manner the user is put in control of the content relating to his identity, but parameters relevant to that identity may be changed only under conditions wherein the risk of identity theft is reduced.

In a further embodiment, the method includes obtaining a user's medical information from the user, and the data set includes the user's medical information.

Definitions. As used in this description and the accompanying claims, the following terms shall have the meanings indicated, unless the context otherwise requires:
  (i) A user's "personal information" includes (a) any alphanumeric identifier of a particular natural person used or issued by a governmental authority or a merchant in connection with the user, such as a credit card number of the user, the user's passport number, the user's social security number, the user's tax identification number, driver's licence number, checking account numbers, etc., together with the identity of the governmental authority, banking or financial institution in each case; (b) the user's name; and (c) contact information pertinent to the user. Optionally, "personal information" may include any or all of the following: (i) any variant of the user's name used by such governmental authority or merchant and (ii) the particular contact information used by such governmental authority or merchant for communicating with the user.

(ii) A "merchant" includes any banking or financial institution or any person or entity (including a retail establishment, hospital, or educational institution} providing services or goods for monetary consideration.

(iii) "Contact information" pertinent to a natural person includes information pertinent to communicating with the person, such as the person's home or business address or telephone number or E-Mail address.

(iv) A user's "medical information" includes (a) the name of a natural person, in a caring relation to the user, whom the user wishes to be notified in the event of the user's illness, injury, or death and (b) contact information pertinent to the caring natural person. Optionally, "medical information" may include any or all of the following: (i) medical treatment information, including medical conditions (such as allergy to penicillin) and religious requirements (for example barring blood transfusions), important to treating the user under emergency circumstances; (ii) information concerning participation by the user in any organ donor program; (iii) health proxy and living will information, concerning scope of medical treatment desired by the user under severe medical circumstances; (iv) the name of any person holding a health proxy of the user and contact information pertinent to such person; and (v) health provider and health insurance information pertinent to the user.

(v) A "physiological identifier associated with a user" is physiological feature of the user, capable of uniquely identifying the user, such as, for example, the appearance of the user's face, a fingerprint of the user, the configuration of an iris in an eye of the user, the user's voice or speech (that is, characteristics of utterances of the user), a sample of the user's DNA, or the sequence of a relevant portion of such a DNA sample.

(vi) A "representation" of a physiological identifier is an abstraction, capable of being stored in a digital storage medium, of the physiological identifier, that retains characteristics of the identifier to a degree sufficient to permit reasonably reliable discrimination between the user and another natural person. The abstraction may, for example, be a digitized photograph of the user's face, and the photograph may be manually or automatically compared with the face of a subject purporting to be the user.

(vii) The term "set" is used in the mathematical sense, and a "set" is not empty; that is, a "set" has at least one member.

(viii) A "multiplicity" of terminals means at least three terminals.

(ix) A "physiological identifier transducer" includes any device (such as a fingerprint reader or a voice terminal/ analyzer) that transforms physical information, derived from a physiological feature of a human subject that is capable of uniquely identifying the subject, into computer-readable data useful for identifying the subject.

(x) An account that "authorizes the transfer of funds" is one such as a checking account, a debit card account, or a credit card account.

(xi) An account that is "based on the extension of credit to the account holder" includes a wide variety of account relationships, including those based on the furnishing of goods or services wherein the cost of the goods or services is billed to the recipient or to a third party after the account is opened. Examples include health care services billed to an insurer, stock brokerage margin accounts, etc.

In a series of further and important embodiments, the first set of physiological identifiers may include a plurality of members. In this way, the level of reliability in determination of authenticity may be selected in accordance with requirements of existing circumstances. For example, embodiments of the invention include methods and systems wherein the first set of identifiers includes at least one member selected from the group consisting of a fingerprint of the user and the configuration of an iris in an eye of the user and at least one member selected from the group consisting of characteristics of utterances of the user and the appearance of the user's face. These two groups offer differing levels of reliability—fingerprints and iris configuration offering potentially greater reliability than characteristics of utterances of the user and the appearance of the user's face, since both utterances and facial appearance can be disguised. On the other hand, it may be more convenient to utilize characteristics of utterances or facial appearance for authentication. In circumstances where such convenience outweighs the risks associated with the reduced level of reliability, these forms of authentication may be used, even though more reliable forms of authentication might be required, for example, for user modification of data in the user's data set.

A related embodiment of a system in accordance with the present invention provides a multiplicity of remotely distributed terminals in communication with the data base, and each terminal includes a physiological identifier transducer and a communication link to a merchant. (The communication link may be as simple as a telephone connection, or it may be a data network directly to the merchant or indirectly over a path that includes the data base, or it may be over the Internet.) In this fashion, a user may, for example, enter into a transaction with the merchant over the Internet or over the telephone, and then physically go to a location near the user where a terminal is located, and use the terminal to authenticate the transaction. Or the transaction may be entered into at the terminal at substantially the same time as it is authenticated. Transactions wherein this system may be used include, for example, those over a desired threshold amount. This system therefore includes a multi-user personal information data base, a multiplicity of remotely distributed terminals in communication with the data base and having a communication link with a merchant, and an authenticity checker which determines whether there is a sufficient match between the output of a physiological identifier transducer attributable to a subject purporting to be a user and a physiological identifier in the first. The data base includes, for each user, a data set pertinent to such user, and the data set including such user's personal information obtained from the user and a representation of a first set of physiological identifiers associated with the user.

In a further embodiment of methods and systems in accordance with the present invention, a subject is permitted to modify information in the stored data set only if the subject provides the new set of physiological identifiers under a condition permitting verification, independent of the physiological identifiers, that the new set is being provided by the person purporting to provide them. Such a condition may include the physical presence of the subject when providing the new set. Alternatively, or in addition, the condition may include having the subject provide the new set when prompted to do so or having the subject provide a non-physiological identifier. The non-physiological identifier may be selected from the group consisting of a password and a pass card. Alternatively, the non-physiological identifier is provided in the course of a session, over a computer network, employing a user's public and private keys.

In yet another related embodiment, there is provided a method for authenticating a user transaction. The method includes obtaining a test set of physiological identifiers from a subject purporting to be the user and accessing information in the data set pertinent to the user stored in accordance with embodiments previously described. The method also includes determining if there is a sufficient match between at least one member in the test set and a corresponding physiological identifier represented in the data set. In a further related embodiment, the database is accessible via a server at a first location; obtaining the test of physiological identifiers is performed at a second location remote from the first location; and determining if there is a sufficient match includes communicating with the server from the second location over a network. The network may, for example, be a global communication network, such as the Internet. Optionally, obtaining the test set of physiological identifiers is performed under supervision of a merchant. As an additional option, determining if there is a sufficient match may be performed without revealing content of the first data set to the merchant. Indeed, the entire data base may be maintained in a manner that it is confidential to the merchant.

In further related embodiments, the transaction is a change of address for an account. In another embodiment, the transaction is an application to open an account. In either of these embodiments, the account may be one that authorizes the transfer of funds. Alternatively, or in addition, the account may be based on the extension of credit to the account holder.

In another further related embodiment, the transaction is an application to a government agency for one of a license and a renewal of a license. The license may be, for example, a driver's license or a passport, or a professional license. Alternatively, the transaction is an application to a government agency for one of an identification token and a renewal of an identification token. The identification token, for example, may be an identification card or a social security number.

In another embodiment, the invention provides a digital storage medium on which has been recorded a multi-user personal information data base. The data base includes, for each user; a data set pertinent to such user. This data set includes:

(a) such user's personal information obtained from the user;

(b) an authentication set of physiological identifiers associated with the user; and (c) such user's emergency information obtained from the user.

In yet another embodiment the invention provides a system for updating a personal information database containing a data set for each one of multiple users. Each data set including a user's personal information and a representation of a first set of physiological identifiers associated with the user. The system of this embodiment includes:

a physiological identifier transducer having an output representing a physiological identifier associated with a subject;

a user access authorization module, coupled to the physiological identifier transducer, the database, for determining whether the output of the physiological identifier transducer sufficiently matches the representation of the first set of physiological identifiers, so that the subject is authenticated as the user;

a user data set access module, coupled to the user access authorization module and to the database, for accessing the user data set, in the event that the user access authorization module has authenticated the subject as the user; and a user data set update module, coupled to the database and to a user input, permitting the user to update such user's corresponding data set in the database.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In an important embodiment, the present invention provides for multiple users a central registration of information that is of critical importance to the user, and such information includes what we have defined above as "personal information" and "medical information" of the user. In this embodiment, the information content is established and modifiable only by the user (or, optionally, by a parent or guardian). Furthermore, the information is subject to authentication on the basis of one or more physiological identifiers of the user. Also, in this embodiment, information pertinent to the user is made available only on a selected basis to authorized parties and in accordance the appropriate context. Finally, the registration system in accordance with this embodiment may be managed in cooperation with law enforcement agencies to deter fraudulent use by providing physiological identifiers in the form, for example, of photographs and fingerprints, when probable cause has been established for disclosure to law enforcement agencies, as evidenced by the issuance of a search warrant.

An information registry that is consistently managed in accordance with the embodiment described in the previous paragraph may be expected to become a trusted source of the information which it stores. updated contact information.

We have referred above to a "physiological identifier associated with a user" as a physiological characteristic of the user, capable of uniquely identifying the user. We gave as examples, the appearance of the user's face, a fingerprint of the user, the configuration of an iris in an eye of the user, characteristics of the user's voice or speech (i.e, characteristics of utterances of the user), a sample of the user's DNA, or the sequence of a relevant portion of such a DNA sample. Further information about the technology associated with the use of physiological identifiers of this nature in a computing environment appears in an article by G. Gunnerson, "Are you ready for Biometrics?", 18 PC Magazine, No. 4, 160–178 (Feb. 23, 1999). This article, which is incorporated herein by reference in its entirety, discloses commercially available products to protect against unauthorized computer system access by utilization of a physiological identifier such as fingerprint, facial appearance, and characteristics of one's voice and speech, sometimes in tandem with a non-physiological identifier such as a smart card or a password. See also the content, which is hereby incorporated herein by reference in its entirety, of the following web sites: www.biometrics.org (The Biometric Consortium), www.emory.edu/BUSINESS/et/biometric/(biometric technology explained at Emory University site), http://webusers.anet-stl.com/~wrogers/biometrics/ (The Biometric Digest).

Figure 1:
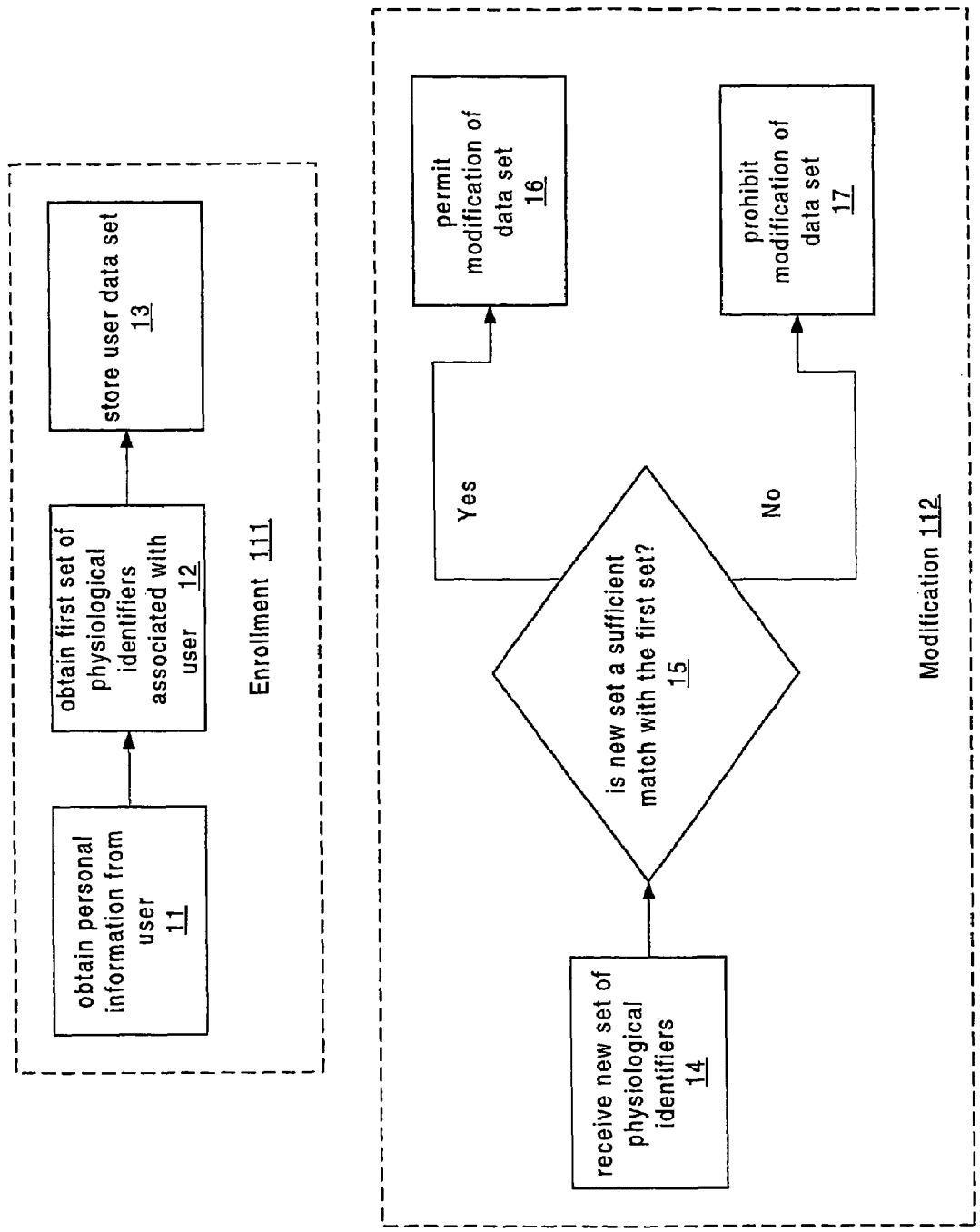
FIG. 1 is a block diagram of a preferred embodiment of a method in accordance with the present invention.

In FIG. 1 is shown a block diagram of a preferred embodiment of a method in accordance with the present invention. This embodiment includes two phases, an enrollment phase 111 and a modification phase 112. In the enrollment phase, personal information is obtained from the user in box 11. Optionally medical information is also obtained from the user. Next in box 12 there is obtained a first set of physiological identifiers associated with the user. In box 13 the user data set, which includes the user's personal information (and optionally medical information obtained from the user) and a representation of the physiological identifiers associated with the user, is stored in the database.

In the modification phase 112, a subject is permitted to modify data in the user's data set if it is determined that the subject is the user. In box 14, there is received a new set of physiological identifiers from the subject. In box 15, there is conducted a test to determine whether there is a sufficient match between the new set of physiological identifiers and the first set of physiological identifiers obtained in box 12. If the match is not sufficient, then in box 17 it is prohibited to modify the data set. Alternatively, if the match is sufficient, then, in box 16, the subject (who is authenticated as the user) is permitted to modify the data set.

Figure 2:
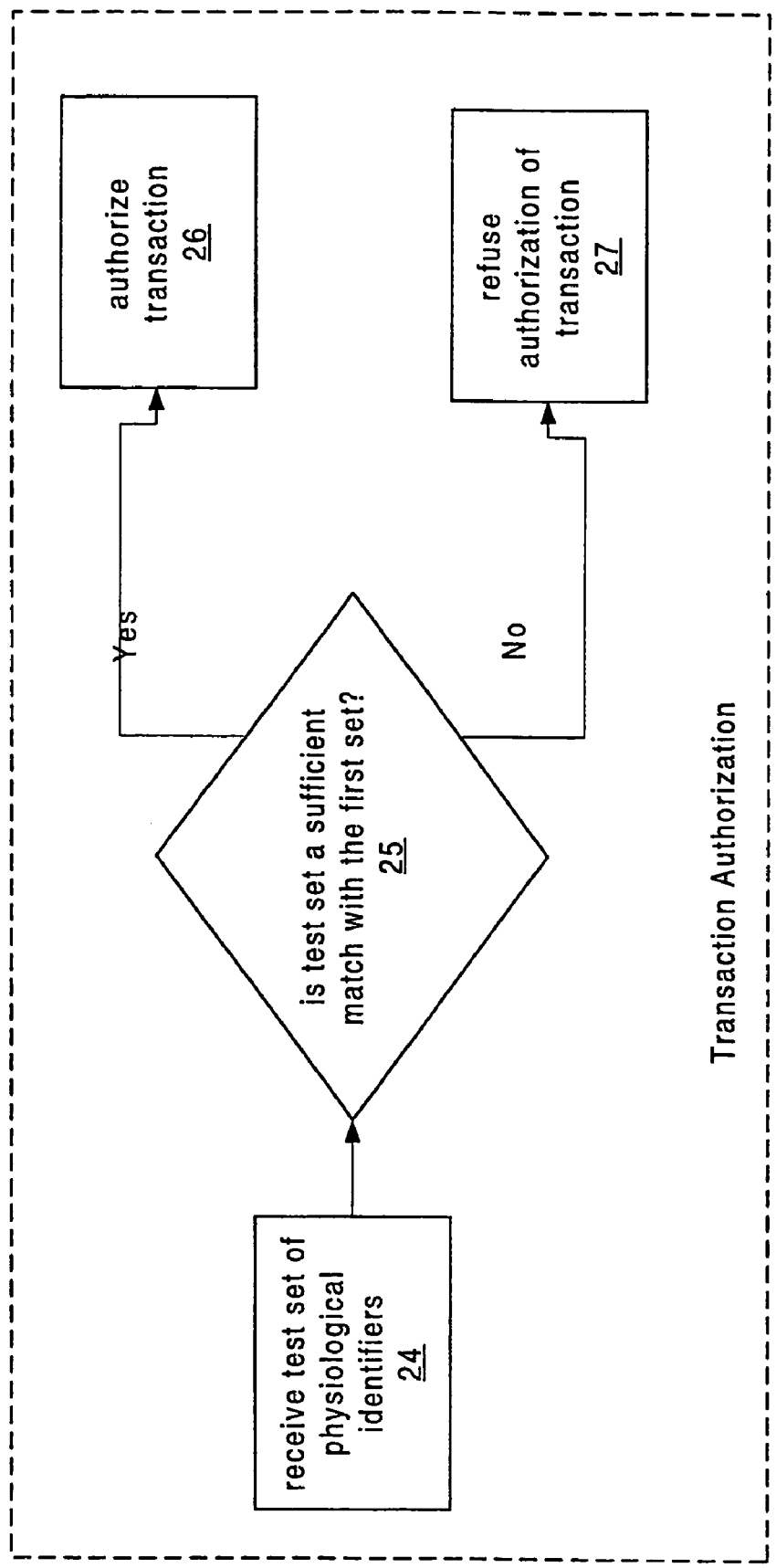
FIG. 2 is a block diagram of an embodiment of the invention employed for authentication of a transaction.

Once the enrollment phase 111 is complete, so that a first set of physiological identifiers has been obtained from the user, it is possible to use the enrolled information to authenticate a transaction in a manner generally analogous to the modification phase 112 discussed above in connection with FIG. 1. FIG. 2 thus presents a block diagram of an embodiment of the invention employed for authentication of a transaction in a manner analogous to the modification phase 112 of FIG. 1. Thus in box 24 there is received a test set of physiological identifiers from the subject. In box 25, there is conducted a test to determine whether there is a sufficient match between the test set of physiological identifiers and the first set of physiological identifiers obtained in box 12. It the match is not sufficient, then in box 27 it is prohibited to modify the data set. Alternatively, if the match is sufficient, then, in box 26, the subject (who is authenticated as the user) is permitted to modify the data set.

Figure 3:
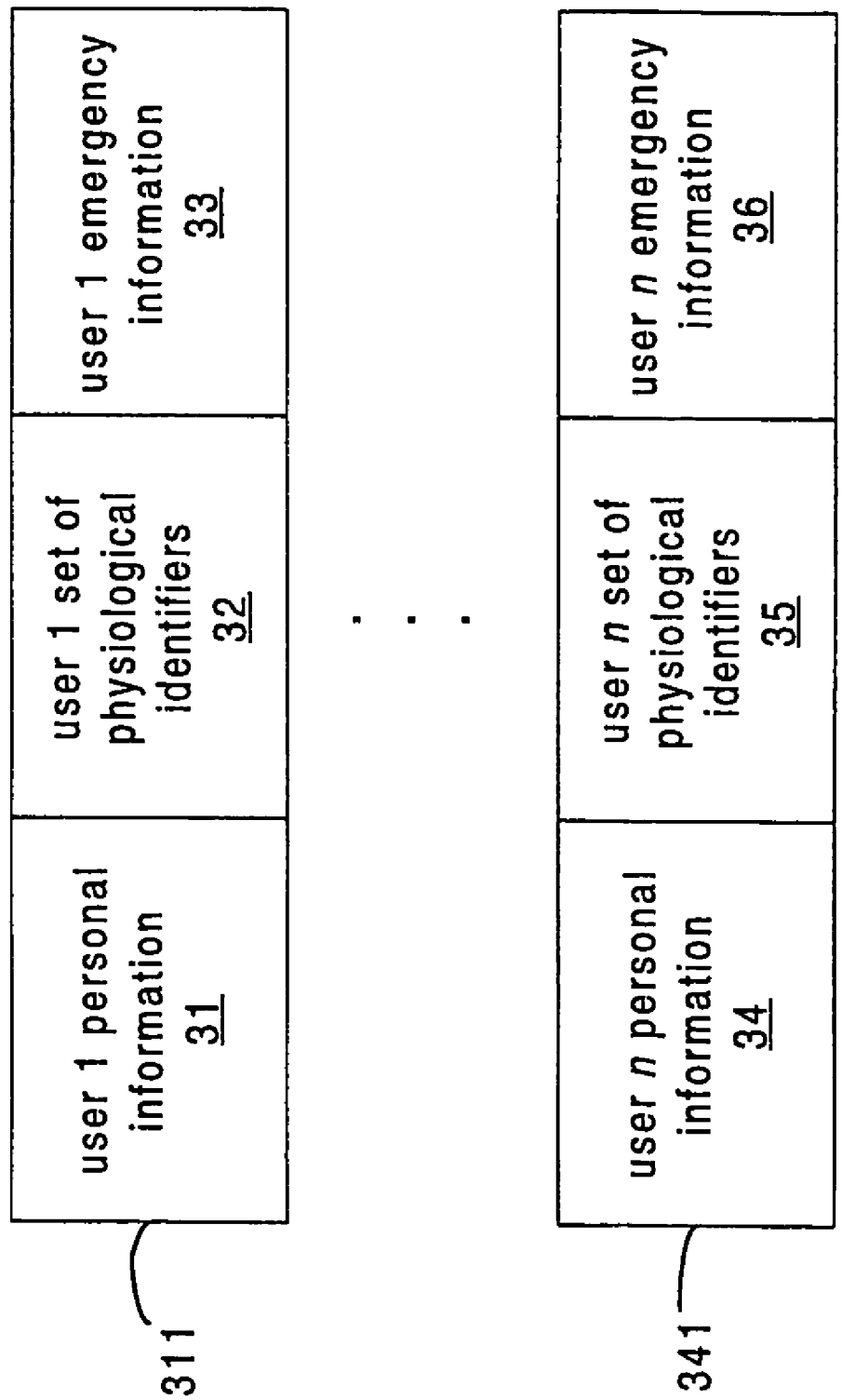
FIG. 3 is illustrates in schematic form a structure for a database in accordance with an embodiment of the present invention.

In FIG. 3 is illustrated in schematic form a structure for a database in accordance with an embodiment of the present invention. Row 311 illustrates a record for user 1. A first portion 31 of the record is used to store user 1 personal information. Another portion 32 of the record is used to store a set of physiological identifiers associated with user 1. Another portion 33 of the record is used to store emergency information pertinent to user 1. A similar structure is employed for each other user, illustrated in row 341 for user n, so that a first portion 34 of the record stores user n personal information, a second portion 35 stores user n set of physiological identifiers, and a third portion 36 stores user n emergency information. Although the structure of the database illustrated here provides a contiguous record for each user, it is within the scope of the present invention to provide a database where the information associated with a given user is stored in a manner that the information associated with a given user is not contiguous. For example, the information for a given user may be stored in various elements in various locations and accessed by an index that is common to all elements for any given user. A wide range of data structures may be implemented in accordance with procedures known in the art.

Figure 4:
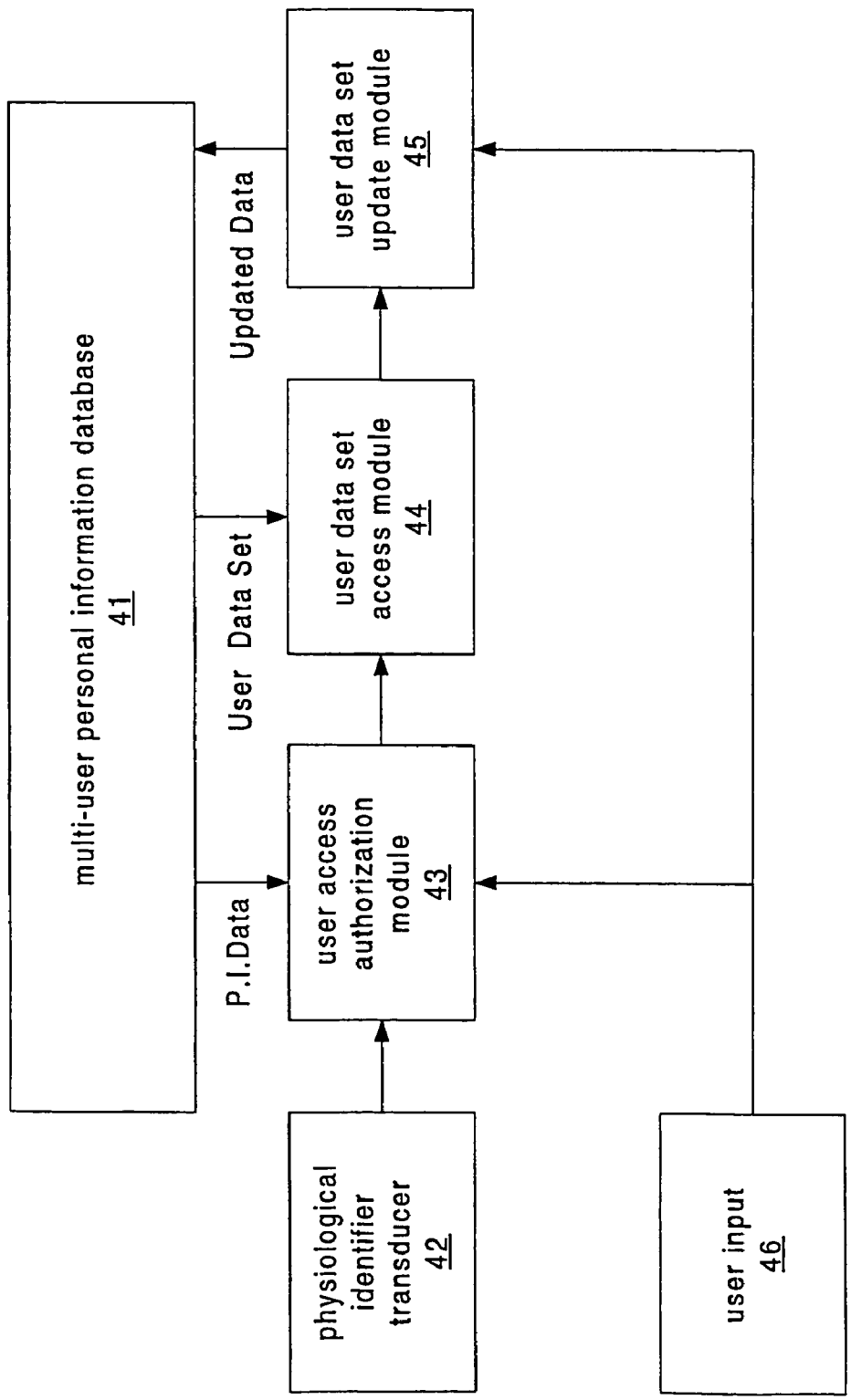
FIG. 4 is a block diagram of an embodiment of the present invention providing a system for updating a personal information database containing a data set for each one of multiple users.

In FIG. 4 is shown a block diagram of an embodiment of the present invention providing a system for updating a personal information database 41 containing a data set for each one of multiple users. Each data set, as described in connection with FIG. 3, includes a user's personal information and a representation of a first set of physiological identifiers associated with the user. The system of this embodiment includes a physiological identifier transducer 42 having an output representing a physiological identifier associated with a subject. A user access authorization module 43, triggered by user input 46, is coupled to the physiological identifier transducer 42 and also to the database 41. This module obtains from the database 41 the representation of the first set of physiological identifiers associated with the user who the subject purports to be. The representation data is compared with the output of the physiological identifier transducer 42 to determine whether there is a sufficient match between the first set of physiological identifiers and the physiological identifier data produced by the transducer 42. When the match is sufficient, the subject is authenticated as the user.

The output of the user access authorization module 43 is provided to the user data set access module 44. The user data set access module 44 is coupled to the user access authorization module 43 and to the database 41. In the event that the user access authorization module 43 has authenticated the subject as the user, the user data set access module 44 accesses the user data set in the database 41. The user data set update module 45 is coupled to the user data set access module 44, as well as to the database 41 and to the user input 46; the user data set update module 45 then permits the user to update such user's corresponding data set in the database.

Figure 5:
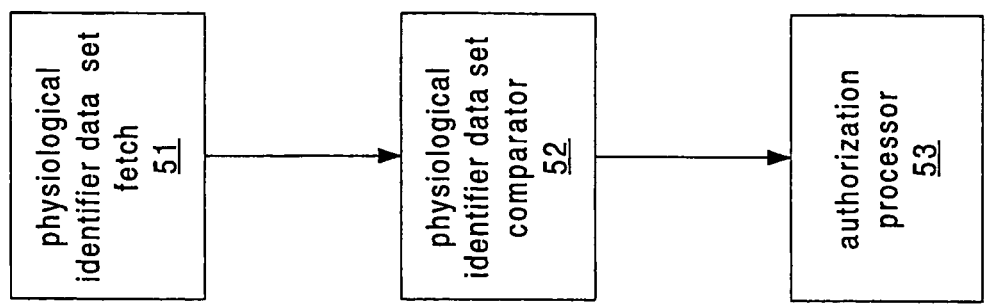
FIG. 5 is a block diagram illustrating operation of the user access authorization module 43 of FIG. 4.

FIG. 5 illustrates operation of the user access authorization module 43 of FIG. 4. This module in fact includes three components. The first component is the physiological identifier data set fetch 51. This component obtains representation data from the database 41 pertaining to the first set of physiological identifiers associated with in the user who the subject purports to be. The component 51 passes the data fetched to the physiological identifier data set comparator 52, which compares the fetched data with the data from the physiological identifier transducer 42. The authorization processor 53 takes the output of the comparator 52 and provides an authorization signal to the user data set access module 44 in the event of a sufficient match found by the comparator 52.

Figure 6:
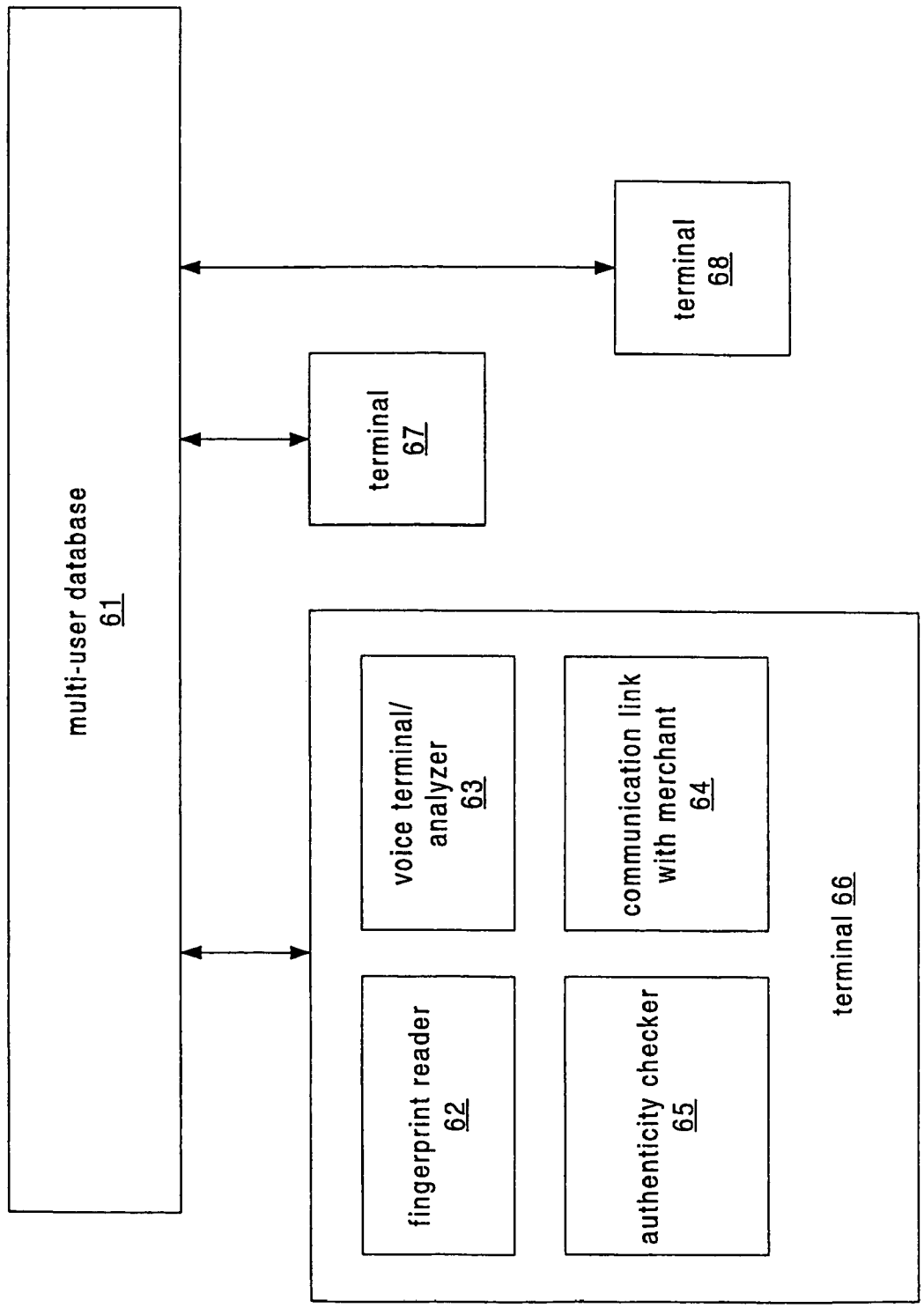
FIG. 6 is a block diagram of an embodiment of a system in accordance with the present invention providing a multiplicity of remotely distributed terminals in communication with a multi-user personal information data base.

FIG. 6 is a block diagram of an embodiment of a system in accordance with the present invention providing a multiplicity of remotely distributed terminals in communication with a multi-user personal information data base. The multi-user database, item 61, is a database of the general type described above in connection with FIGS. 1 through 4. The database includes a data set pertinent to each user. Each data set includes a first set of physiological identifiers associated with the user. Each data set also includes such user's personal information obtained from the user, and optionally such user's medical information. A multiplicity of remotely distributed terminals, shown here as items 66, 67, and 68, are in communication with the database 61 over one or more networks. For example, the terminals 66–68 may be in communication with the database 61 over the Internet. Each of these terminals may include similar components, and for convenience we discuss the components of terminal 66. The terminal of this embodiment includes a fingerprint reader 62 and a voice terminal/analyzer 63. Each of the items 62 and 63 is, more broadly stated, a physiological identifier transducer, namely a device that transforms physical information, derived from a physiological feature of a human subject that is capable of uniquely identifying the subject, into computer-readable data useful for identifying the subject. (Alternatively or additionally, the physiological identifer transducer may be employed). Thus a user may utilize the fingerprint reader 62 and the voice terminal/analyzer 63 to provide a set of physiological identifiers that are represented and stored as part of such user's data set in the general manner described above in connection with FIG. 1.

Alternatively, or in addition, the user may wish to authenticate a transaction being made with a merchant. In this connection, the user may utilize either the fingerprint reader 62 or the voice terminal/analyzer 63, or both of them, from which may be derived a test set of physiological identifiers in a manner described previously in connection with FIG. 2. The authenticity checker 65 is then used to retrieve physiological identifier data stored as part of the user's data set in the database 61 and then to determine whether data from the test set of physiological identifiers sufficiently matches the corresponding retrieved data. The results of the match determination are then communicated with the merchant using the communication link 64.

Although the authenticity checker 65 is shown in FIG. 6 as part of the terminal 66, it may in fact be located remotely from the terminal over a suitable network, and may be conveniently located at the same network node, for example, as the database 61. In such a case, the physiological identifier transducer data from the fingerprint reader 62 and the voice terminal/analyzer 63 may be transmitted over the network to the remotely located authenticity checker for determination of the sufficiency of the match with the corresponding retrieved data. Similarly, the communication link 64 may optionally run from a location other than the terminal to the merchant; for example, where the checker is physically adjacent to the database 61, the link 64 may run from the checker to the merchant. In a simple embodiment, the authenticity checker 65 is part of the terminal 66 and includes a display for readout by a human operator; and the link 64 is a manually operable telephone providing a dial-up telephone connection to the merchant. In this manner, a human operator may supervise operation of the physiological identifier transducers, and may telephone the merchant with the results of the authenticity checker. Alternatively, or in addition, the communication link 64 may be over a network, including over the Internet, and the results of the authenticity checker 65 may be automatically sent to the merchant.

It is within the scope of embodiments of the present invention to provide in the manner described in connection with FIG. 6 a very large number of terminals dispersed over a geographically large region embracing one or more political subdivisions, countries, and even continents. The terminals may be located in pre-existing facilities of existing enterprises, such as banks, travel agencies, or insurance agencies. In this manner an individual may effectuate enrollment in accordance with FIG. 1 and later authenticate a transaction in the manner of FIG. 2 merely by going to a local terminal, with the result of the later authentication session being transmitted to the merchant via the communication link. As an alternative to using a terminal for authentication alone, it is equally possible to use a terminal to enter into the transaction simultaneously with the authentication process.

In FIG. 6, we have shown use, in connection with a single database 61, of two different types of physiological identifiers, fingerprint and utterance characteristics, one type of which (fingerprint) is more reliable than the other (utterance characteristics). On the other hand, the use of utterance for authentication may be accomplished over a telephone without the need for the user to go to a different physical location. It is within the scope of an embodiment of the present invention to store data pertaining to a plurality of physiological identifiers, and, with respect to a given transaction or circumstance, to select an identifier for authentication purposes that offers a desired trade-off between convenience and reliability. In other words, the use of a plurality of physiological identifiers permits adjustment of the reliability of the physiological identifier (by selecting the appropriate type of identifier) to suit a desired level of reliability and therefore, for example, pricing. While FIG. 6 has illustrated fingerprint and utterance characteristics as the physiological identifiers utilized, other combinations may be utilized, for example, iris configuration and facial appearance.

The telephone may be used for providing an utterance for authentication in a manner previously described. In this context, although in FIG. 6 we have shown the physiological identifier transducer for utterances as a voice terminal/analyzer, in fact in related embodiments, the analyzer may be located remotely from the voice terminal. For example, the voice terminal may be as simple as a telephone in communication over a telephone line with a remotely located analyzer, and the analyzer may, for example, be physically adjacent to the database 61. In this manner may institute a telephone call to a central facility that includes the database 61, and the user's utterance may be analyzed with the resulting data run through an authenticity checker and the results provided to the merchant. In lieu of a telephone call to the central facility, the communication of the utterance may be over the Internet. Such an approach, while not as reliable as one that utilizes a human-monitored fingerprint reader, nevertheless provides a physiological identifier that lowers the risk of a fraudulent transaction. In other words, telephone authentication is well suited to circumstances where remote authentication is desired but physically distributed terminals of the type shown in FIG. 6 are not convenient.

An authentication system of the type described in various embodiments may be employed in a wide range of circumstances, including not only E-commerce but also, for example, distance learning and examination taking. In distance learning, the authentication system can be used to confirm actual attendance by persons purporting to be enrolled, and in examination taking, to confirm the authenticity of persons taking examinations. Thus, a system of the present type may be employed in any situation where a person is not physically present or is incapacitated, so normal in-person authentication is not possible or is difficult, and another party needs information about the person for the conduct of some transaction or matter.

The use of the various embodiments described above can reduce the risk of identity theft, because a merchant, intending to rely on the implicit representation that a subject is the one who the subject purports to be, now has the benefit of a physiological identifier (as opposed to merely a password, etc., which may be stolen) confirming the subject's authenticity. Moreover, in a case where identity has already be stolen and a fraud perpetrated, a victim who has previously established a user data record in a multi-user personal information data base of the type described above may utilize the information in the user data record to reestablish identity with one or more merchants. Indeed, an imposter who seeks to steal the identity of a user having a data record that is registered in the multi-user database, under circumstances where a reliable physiological identifier is employed to authenticate a transaction, must risk giving a fingerprint, for example, to the organization managing the multi-user database. Because the imposter's fingerprint may then be accessed by law enforcement officials, for example, using normal warrant procedures, the chances of successful fraud are significantly reduced and a significant deterrent to fraud is also provided.

Another context in which systems of the present type are applicable in various embodiments is in connection with access to a user's medical information. Although access to a user's personal information (as defined above) is desirably restricted to merchants under controlled circumstances, access to at least some of a user's medical information (as defined above) (even when in the same database as the user's personal information) may be made more broadly available to health care providers when a user is physically incapacitated. In this context it is convenient for the user to carry a card or other token to indicate that the user has provided medical information to the applicable multi-user database and even to identify in some manner (for example, by record number or a suitable alphanumeric identifier) the particular data record applicable to the user's medical information. (Similarly, such an identifier may confirm to merchants that the user's personal information has been stored in the database, as well as to facilitate look up of data in the data base.) A health care provider may then use information about the user to access pertinent medical information of the user. In this fashion, for example, the health care provider can have information permitting persons in a caring relationship to the user to be notified, and health care providers may be informed of information affecting treatment of the user. Current information about the status of the user's regular health care provider and health insurance may also be provided in this manner.

In implementing various embodiments described above, it is desirable for the manager of the database to prompt the user on a periodic basis, for example yearly, for an update of the user's personal information and medical information. When updated information is received, the data set of the user can be modified when appropriate authentication, as described, for example, in connection with FIG. 1, has been obtained from the user. It is a feature of embodiments of the present invention that the user's data set cannot be modified, for example, by a credit reporting agency, but only by the user on proper authentication. Given the inherent reliability of a database administered in this manner, it is within the scope of embodiments of the present invention to permit the database administrator on appropriate user authorization to provide change of address information, for example, to merchants.

Pursuant to a further embodiment of the present invention, the sponsor of a personal information data base of the type disclosed herein may provide a guarantee to a credit card issuer or other merchant that if the merchant first utilizes the sponsor's data base to authenticate the contact information or a change of address (offered by a purported user) before the merchant extends credit or effectuates a change of address, for example, then the liability of the merchant for a fraudulent transaction may be reduced or eliminated. In this way, the sponsor may provide a financial incentive to the merchant and justify charging the merchant for the opportunity to utilize the database.

It should be noted that various embodiments of the present invention do not require providing the merchant directly with personal data in the data base. Instead, for example, when a transaction is being authenticated, the merchant need provide the data base sponsor only with a user's physiological identifier(s) (or a representation thereof) and a user's purported identity; the sponsor, upon checking the data base, can thereupon inform the merchant that, for the purported individual, there is a match between the physiological identifier(s) in the data base and the physiological identifier(s) obtained by the merchant. The match determination may be carried out under control of the data base sponsor, or, alternatively, under control of the merchant.

An institution such as a bank, in cooperation with the sponsor of a data base administered in accordance with various embodiments described above, may offer a service, to protect a user, in which a user requires authentication, via use of the data base, of any check written over a certain amount. Indeed, such an approach may be utilized in connection not only with respect to a check but also with respect to any mechanism (credit or debit card transaction, electronic wallet transaction, digital money transaction, etc.) by which funds may be transferred. The user may require authentication (via utilization of the data base) for any instance in which the funds to be transferred exceed a specified amount. In a related embodiment, the user may establish a list of exceptions to the authentication requirement, so that checks can be conveniently written to a spouse, etc.

What is claimed is:

1. A method of administering registration of personal information in a data base in a manner tending to assure integrity of the personal information therein, the method comprising:
   a. obtaining, from each user with respect to whom data is to be placed in the data base, personal information of such user, the content of such personal information initially established by such user in an enrollment phase;
   b. also obtaining, from each such user, a first set of physiological identifiers associated with such user, the first set of physiological identifiers initially provided by such user in the enrollment phase;
   c. storing, in a digital storage medium, a data set pertinent to such user, the data set including such user's personal information and a representation of the physiological identifiers associated with such user; and
   d. permitting a subject claiming to be a specified user to modify the specified user's personal information in the stored data set pertinent to such user only if (i) the subject provides a new set of physiological identifiers and (ii) it is determined, by recourse to the stored data set, that there is a sufficient match between at least one member in the new set and a corresponding member of the first set, so that the subject is authenticated as the specified user, so that there is established a repository of personal information using physiological identifiers to protect against unauthorized modification.

2. A method according to claim 1, further comprising obtaining from such user such user's medical information, wherein the data set includes such user's medical information, and permitting a subject claiming to be a specified user to modify the specified user's medical information in the stored data set pertinent to such user only if (i) the subject provides a new set of physiological identifiers and (ii) it is determined, by recourse to the stored data set, that there is a sufficient match between at least one member in the new set and a corresponding member of the first set, so that the subject is authenticated as the specified user, so that there is established a repository of medical information using physiological identifiers to protect against unauthorized modification.

3. A method according to claim 1, wherein the first set includes a plurality of members.

4. A method according to claim 1, wherein the first set of physiological identifiers includes the appearance of such user's face.

5. A method according to claim 1, wherein the first set of physiological identifiers includes characteristics of utterances of such user.

6. A method according to claim 1, wherein the first set of physiological identifiers includes a fingerprint of such user.

7. A method according to claim 1, wherein the first set of physiological identifiers includes the configuration of an iris in an eye of such user.

8. A method according to claim 1, wherein the first set includes at least one member selected from the group consisting of a fingerprint of such user and the configuration of an iris in an eye of such user and at least one member selected from the group consisting of characteristics of utterances of such user and the appearance of such user's face.

9. A method according to any of claims 1 or 2, wherein, pursuant to step (d), the subject is permitted to modify the user's information in the stored data set only if the subject provides the new set of physiological identifiers under a condition permitting verification, independent of the physiological identifiers, that the new set is being provided by the person purporting to provide them.

10. A method according to claim 9, wherein the condition includes the physical presence of the subject when providing the new set.

11. A method according to claim 9, wherein the condition includes having the subject provide the new set when prompted to do so.

12. A method according to claim 9, wherein the condition includes having the subject provide a non-physiological identifier.

13. A method according to claim 12, wherein the non-physiological identifier is selected from the group consisting of a password and a pass card.

14. A method according to claim 12, wherein the non-physiological identifier is provided in the course of a session, over a computer network, employing a user's public and private keys.

15. A method according to claim 1, further comprising:
prompting each user, on a periodic basis, to update the user's personal information in the data set pertinent to such user.

16. A method according to claim 1, further comprising:
obtaining a test set of physiological identifiers from a subject purporting to be a specific user;
accessing information in the data set pertinent to the specific user; and
determining if there is a sufficient match between at least one member in the test set and a corresponding physiological identifier represented in the data set.

17. A method for authenticating a user transaction, the method comprising:
obtaining a test set of physiological identifiers from a subject purporting to be a specific user;
accessing information in a first data set pertinent to the specific user stored in a registration data base, the data base containing information provided by multiple users in a separate data set for each user, each data set of a specific user including (i) personal information, of the specific user, that has been established by the specific user, and (ii) a representation of a first set of physiological identifiers, associated with the specific user, that has been provided by the specific user, the data base being maintained under conditions wherein modification by a subject claiming to be a specific user of the specific user's personal information in a stored data set pertinent to the specific user is permitted only if (i) the subject provides a new set of physiological identifiers and (ii) it is determined, by recourse to the stored data set, that there is a sufficient match between at least one member in the new set and a corresponding member of the first set, so that the subject is authenticated as the specific user, so that there is established a repository of personal information using physiological identifiers to protect against unauthorized modification; and
determining if there is a sufficient match between at least one member in the test set and a corresponding physiological identifier represented in the data set.

18. A method according to claim 17, wherein:
the database is accessible via a server at a first location;
obtaining the test set of physiological identifiers is performed at a second location remote from the first location;
determining if there is a sufficient match includes communicating with the server from the second location over a network.

19. A method according to claim 18, wherein:
obtaining the test set of physiological identifiers is performed under supervision of a merchant.

20. A method according to claim 19, wherein:
determining if there is a sufficient match is performed without revealing content of the first data set to the merchant.

21. A method according to any of claims 18, 19, or 20, wherein the transaction is a change of address for an account.

22. A method according to any of claims 18, 19, or 20, wherein the transaction is an application to open an account.

23. A method according to claim 21, wherein the account authorizes the transfer of funds.

24. A method according to claim 22, wherein the account authorizes the transfer of funds.

25. A method according to claim 21, wherein the account is based on the extension of credit to the account holder.

26. A method according to claim 22, wherein the account is based on the extension of credit to the account holder.

27. A method according to claim 18, wherein the transaction is an application to a government agency for one of a license and a renewal of a license.

28. A method according to claim 18, wherein the transaction is an application to a government agency for one of an identification token and a renewal of an identification token.

29. A computer system comprising:
a digital storage medium on which has been recorded a multi-user personal information data base, the data base comprising, for each specific user, a data set pertinent to the specific user, the data set including:
  (a) the specific user's personal information obtained from the specific user;
  (b) a representation of a first set of physiological identifiers associated with the specific user; and
  (c) the specific user's emergency information obtained from the specific user; and
a computer process running in association with the storage medium to cause the storage medium to be maintained under conditions wherein modification by a subject claiming to be a specific user of such specific user's personal and emergency information in a stored data set pertinent to the specific user is permitted only if (i) the subject provides a new set of physiological identifiers and (ii) it is determined, by recourse to the stored data set, that there is a sufficient match between at least one member in the new set and a corresponding member of the first set, so that the subject is authenticated as the specific user, so that there is established a repository of personal information using physiological identifiers to protect against unauthorized modification.

30. A system for updating a personal information database containing a data set for each one of multiple users, each data set including a user's personal information and a representation of a first set of physiological identifiers associated with the user, the system comprising:
  a. a physiological identifier transducer having an output representing a physiological identifier associated with a subject claiming to be a specified user;
  b. a user access authorization module, coupled to the physiological identifier transducer and to the database, for determining whether the output of the physiological identifier transducer sufficiently matches the representation of the first set of physiological identifiers, so that the subject is authenticated as the specified user;
  c. a user data set access module, coupled to the user access authorization module and to the database, for accessing the user data set pertinent to the specified user, in the event that the user access authorization module has authenticated the subject as the specified user; and
  d. a user data set update module, coupled to the database, to the user data set access module, and to a user input, permitting the subject to update the specified user's personal information in the corresponding data set in the database in the event that the user data set access module has provided access to the user data set, so that there is established a repository of personal information using physiological identifiers to protect against unauthorized modification.

31. A system for authenticating transactions, the system comprising:
  a. a multi-user personal information data base, the data base comprising, for each specific user, a data set pertinent to the specific user, the data set including:
    (i) personal information, of the specific user, that has been established by the specific user;
    (ii) a representation of a first set of physiological identifiers, associated with the specific user, that has been provided by the specific user;
  the data base being maintained under conditions wherein modification by a subject claiming to be a specific user of the specific user's personal information in a stored data set pertinent to the specific user is permitted only if (i) the subject provides a new set of physiological identifiers and (ii) it is determined, by recourse to the stored data set, that there is a sufficient match between at least one member in the new set and a corresponding member of the first set, so that the subject is authenticated as the specific user, so that there is established a repository of personal information using physiological identifiers to protect against unauthorized modification;
  b. a multiplicity of remotely distributed terminals in communication with the data base, each terminal including a physiological identifier transducer and a communication link with a merchant; and
  c. an authenticity checker, which determines whether there is a sufficient match between the output of a physiological identifier transducer attributable to a subject purporting to be a user and a physiological identifier in the first set.

32. A system according to claim 28, wherein the first set includes a plurality of members.

33. A system according to claim 28, wherein the first set includes at least one member selected from the group consisting of a fingerprint of the user and the configuration of an iris in an eye of the user and at least one member selected from the group consisting of characteristics of utterances of the user and the appearance of the user's face.

34. A method according to claim 1, wherein obtaining personal information of such user includes obtaining data pertaining to one or more merchants.

35. A method according to claim 1, wherein any financial information that may be in the data set is not limited to that of a particular banking or financial institution.

36. A method of administering personal information in a data base in a manner tending to assure integrity of data therein, the data base being of a type wherein a stored data set is established for each user and there has been obtained from each user with respect to such data a first set of physiological identifiers associated with such user and included in the data set, the method comprising:
  a. obtaining from a subject seeking to modify information in the stored data set pertinent to such user a new set of physiological identifiers, and
  b. permitting the subject to modify such user's personal information in the stored data set only if it is determined, by recourse to the stored data set, that there is a sufficient match between at least one member in the new set and a corresponding member of the first set, so that the subject is authenticated as such user, so that there is established a repository of personal information using physiological identifiers to protect against unauthorized modification.

37. A method according to claim 36, wherein any financial information that may be in the stored data set is not limited to that of a particular banking or financial institution.

38. A method according to claim 36, wherein obtaining the new set of physiological identifiers and permitting the subject to modify the information in the stored data set are performed in a facility established for that purpose.

39. A method for authenticating a user transaction using a data base of a type wherein a stored data set is established for each potential user and there has been obtained from each potential user with respect to such data a first set of physiological identifiers associated with such potential user and included in the data set, the method comprising:

administering the data base in a manner such that personal information in a stored data set pertinent to an individual may not be modified by a person purporting to be the individual unless there has been obtained a sufficient match between at least one physiological identifier in the stored data set and a new physiological identifier obtained from the person, so that there is established a repository of personal information using physiological identifiers to protect against unauthorized modification;

obtaining a test set of physiological identifiers from a subject purporting to be a specific user;

accessing information in the data set pertinent to the specific user in the data base; and determining if there is a sufficient match between at least one member in the test set and a corresponding physiological identifier represented in the data set.

40. A method according to claim 39, wherein any financial information that may be in the stored data set is not limited to that of a particular banking or financial institution.

41. A method according to any of claims 1, 17, 36 or 39, further comprising:

retaining a representation of at least one of the new set of physiological identifiers, if there is an insufficient match.

42. A method according to claim 41, further comprising:

providing access to the retained representation of the at least one of the new set of physiological identifiers by a law enforcement official.

43. A method according to any of claims 1 or 36, further comprising:

permitting a third party of a specified kind to view but not modify the user's personal information in the stored data set without requiring such third party to provide a physiological identifier that sufficiently matches a corresponding member of the first set of physiological identifiers stored in the data set.

44. A method according to claim 43, wherein the specified kind is a merchant.

45. A method according to claim 2, further comprising:

permitting a third party of a specified kind to view but not modify the user's medical information in the stored data set without requiring such third party to provide a physiological identifier that sufficiently matches a corresponding member of the first set of physiological identifiers stored in the data set.

46. A method according to claim 45, wherein the specified kind is a health care provider.

47. A method according to any of claims 1 or 2, further comprising:

providing, to each user, a token indicating that the user has provided information to the data base.

48. A method according to claim 47, wherein the token comprises a card.

49. A method according to claim 47, wherein the token includes an identifier that, when presented to the data base by a third party, enables such third party to access but not modify the user's information in the data base.

50. A method according to claim 49, wherein the identifier comprises:

a record number identifying the data set pertinent to such user.

* * * * *

UNITED STATES PATENT AND TRADEMARK OFFICE
CERTIFICATE OF CORRECTION

PATENT NO.        : 6,985,887 B1                                   Page 1 of 1
APPLICATION NO. : 09/448722
DATED             : January 10, 2006
INVENTOR(S)       : Bruce D. Sunstein and Eileen C. Shapiro It is certified that error appears in the above-identified patent and that said Letters Patent is hereby corrected as shown below:

Col. 6, line 57
delete "updated contact information."

Col. 7, line 54
  replace "It the match is not sufficient, than box 27 it is prohibited to modify the data set. Alternatively, if the match is sufficient, then, in box 26, the subject (who is authenticated as the user) is permitted to modify the data set."
  with --If the match is not sufficient, then in box 27 authorization of the transaction is refused. Alternatively, if the match is sufficient, then, in box 26, the transaction is authorized. The transaction authenticated herein may be any type of transaction where it is important or desirable to establish that a party is authentic—for example, a sale involving property involving a significant amount of money, or access to an airplane for travel on a ticket already purchased. --

Signed and Sealed this

Fifteenth Day of August, 2006

JON W. DUDAS
*Director of the United States Patent and Trademark Office*